Oct. 9, 1951  C. L. HAMM  2,570,800
CONNECTOR FOR DYNAMOELECTRIC MACHINES
Filed Nov. 19, 1947
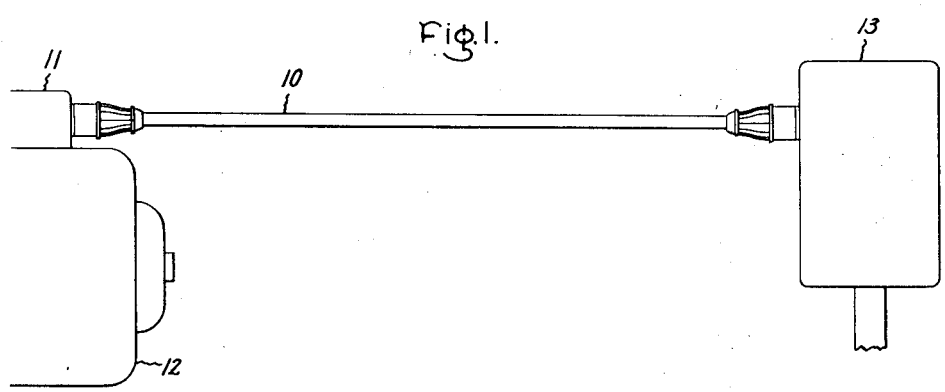
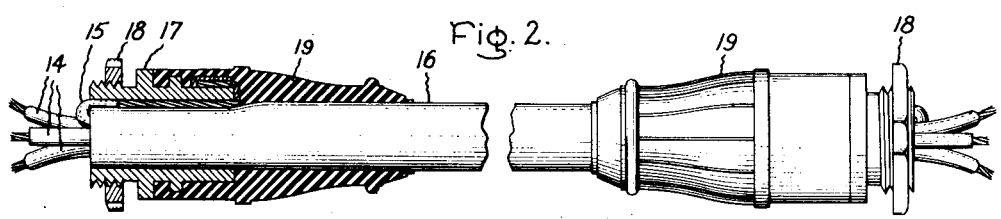
Inventor:
Clarence L. Hamm,
by Crowell S. Mack
His Attorney.

Patented Oct. 9, 1951

2,570,800

UNITED STATES PATENT OFFICE 2,570,800

CONNECTOR FOR DYNAMOELECTRIC MACHINES

Clarence L. Hamm, Marblehead, Mass., assignor to General Electric Company, a corporation of New York Application November 19, 1947, Serial No. 786,945

3 Claims. (Cl. 174—78)

My invention relates to improvements in electrical connectors and more specifically to an improved connector cable adapted to connect a dynamoelectric machine to a power supply.

Heretofore power cables used to supply dynamoelectric machines have often been enclosed in either flexible or rigid metallic conduit, mechanical and electrical connection customarily being made between the conduit and a junction box on the machine by means of a threaded or clamp type fitting. In other applications a plug-and-socket connection is used to attach all the power wires plus a ground wire to the machine. In certain cases it is not feasible to use either metallic conduit or a plug-and-socket connection so that, in the past, the cable and its power wires had to be fastened in some more complicated manner and additional grounding connections usually had to be made to prevent the danger of an operator's receiving an electrical shock. From a safety standpoint this has the added disadvantage that the grounding connections might not be made at all or might work loose.

It is an object of the present invention to provide simple and inexpensive means for overcoming the above-mentioned difficulties.

It is a further object of the present invention to provide an automatic ground for a dynamoelectric machine through the use of a connector cable not enclosed in metallic conduit.

Still another object of this invention is to provide a water-tight connector cable.

Broadly the means employed in the embodiments herein illustrated and described comprises a cable having a plurality of wires encased in a molded covering with threaded metallic end connectors molded in place at each end of the covering. The plurality of wires comprises the number of power wires required plus an additional wire fastened at each of its ends to the respective end connector to provide a grounding circuit.

Other objects and advantages will appear and my invention will be better understood from consideration of the following description taken in connection with the accompanying drawing.

In the drawing Fig. 1 represents a top view of a molded rubber connector cable, or cord set, connected at one end to a terminal box of a dynamoelectric machine, such as a loom motor, and connected at the other end to a supply or switch box to afford a power supply connection for the motor; Fig. 2 represents an enlarged view, partly in section, of the connector cable shown in Fig. 1.

Referring now to Fig. 1, 10 represents a cable connector having an outer covering formed of a molded elastomer such as vulcanized natural rubber. If desired, various synthetic rubbers may be employed such as, for example, compositions comprising copolymers of styrene and butadiene, copolymers of acrylonitrile and butadiene, etc. This connector cable is affixed at one end (by means more fully described in connection with Fig. 2) to a terminal box 11 of a loom motor 12. The loom motor may be of the type adapted to drive an interweaving shuttle and cause it to reverse its direction of motion approximately 200 times per minute. Such rapid reversal of shuttle motion generally causes the driving motor to vibrate accordingly and it is often found that such a motor will move as much as ¼" during each of the 200 cycles each minute. Such extreme vibration makes it impractical to employ either metallic conduit or a plug-and-socket arrangement for the motor power supply leads.

The connector 10 shown in Fig. 1 is connected at its other end to a power supply conduit box 13 in the same manner that it is connected to the motor terminal box.

In Fig. 2, I have shown an enlarged view of the cable connector which comprises three power wires 14, a ground wire 15, a molded elastomer covering 16 for the wires, two metallic end connectors 17 which may conventionally be made of brass and which are threaded at their ends to receive locking nuts 18, and the molded elastomer end coverings or sleeves 19. The ground wire 15 is connected at each end to the respective metallic end connector 17, as by soldering thereto, before the end coverings 19 are molded around the cable. In this manner the dynamoelectric machine is automatically grounded when the nuts 18 are drawn up to firmly affix the cord set to the motor terminal box and to the power supply conduit box. Since these nuts will almost assuredly be pulled up tightly enough so that vibration of the equipment will not be able to loosen them, a very efficient and positive grounding means is thus provided without any necessity of making separate grounding attachments.

In addition, such a connector is completely waterproof, reduces fire hazards, and meets all Fire Underwriters' requirements while, at the same time, it is flexible enough to withstand vibrations over a long period of time.

There is thus provided a device of the character described capable of meeting the objects hereinabove set forth and capable of withstanding vibrations such as those encountered in connection with loom motors and, at the same time, whenever the metallic end connectors are fastened to metallic terminal boxes provided therefor automatically grounding such machines more efficiently, but just as easily as conventional metallic conduit.

While I have illustrated and described a particular embodiment of my invention, modifications thereof will occur to those skilled in the art. I desire it to be understood, therefore, that my invention is not to be limited to the particular arrangement described and I intend, in the appended claims, to cover all modifications which do not depart from the true spirit and scope of my invention.

What I claim as new and desire to secure by Letters Patent of the United States is:

1. A connector cable for use with electrical apparatus, said connector cable comprising a plurality of power wires, a grounding wire extending along said power wires, a covering of molded elastomer surrounding all of said wires intermediate the ends thereof, with said grounding wire extending past each end of said covering and looped back over the surface of said covering for a predetermined distance at each end thereof, two annular metallic end connectors arranged one at each end of said cable, said end connectors surrounding said covering and surrounding the associated looped-back ground wire portion, each of said end connectors having an externally threaded outer portion adapted to cooperate with a nut which may be screwed on said threaded portion to clamp said end connector as to a terminal box, each of the looped-back ends of said ground wire being electrically connected to the respective metallic end connector, and molded end coverings located one at each end of said cable to affix the respective metallic end connector securely to the molded covering around the wires.

2. A connector cable for use with electrical apparatus, said connector cable comprising a plurality of insulated conductor wires, a grounding wire extending along said conductor wires, an initial covering of molded elastomer enclosing the conductor wires and said ground wire, two cylindrical metallic end connectors surrounding and gripping the covering of said wires and arranged one at each end of said cable, each of said metallic end connectors being provided with an external threaded portion at the outer end thereof and provided with a portion having external projections at the inner end thereof and having the inner end thereof electrically connected to the associated ground wire end looped back over said initial covering and inside said metallic end connector to reach said connector inner end, and a flexible sleeve of molded elastomer surrounding and imbedded in the projection portion of the associated metallic end connector and extending inwardly therefrom in gripping relation with the initial elastomer covering surrounding said wires and completely covering said ground wire connection to said metallic end connector.

3. An electric cord set comprising a plurality of power wires and a ground wire arranged in an initial covering of molded elastomer with the respective ends of said ground wire folded back for a predetermined distance over the ends of said initial covering, two metallic end connectors, one arranged at each end of said cord set and surrounding said folded-back ground wire portion and the associated portion of said initial covering, each of said end connectors adapted to make metallic contact with a junction box, said folded-back ground wire portion having an end attached to each of said metallic end connectors, said power wires extending through said end connectors in a direction away from said initial covering, and a molded elastomer covering extending around a portion of each of said end connectors and around said folded-back ground wire connection thereto, whereby each end of said cord set is provided with grounding means in a compact and vibration-proof assembly.

CLARENCE L. HAMM.

REFERENCES CITED

The following references are of record in the file of this patent:

UNITED STATES PATENTS

| Number | Name | Date |
| --- | --- | --- |
| 1,487,937 | Griffin | Mar. 25, 1924 |
| 1,918,070 | Watts | July 11, 1933 |
| 2,100,824 | Wayman | Nov. 30, 1937 |
| 2,112,680 | Sambleson | Mar. 29, 1938 |
| 2,171,331 | Folsom | Aug. 29, 1939 |
| 2,299,878 | Chandler | Oct. 27, 1942 |
| 2,309,439 | Burgett | Jan. 26, 1943 |
| 2,425,834 | Salisbury | Aug. 19, 1947 |